(12) United States Patent
Pagan

(10) Patent No.: US 9,235,703 B2
(45) Date of Patent: Jan. 12, 2016

(54) VIRUS SCANNING IN A COMPUTER SYSTEM

(75) Inventor: William Gabriel Pagan, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1978 days.

(21) Appl. No.: 11/243,642

(22) Filed: Sep. 30, 2005

(65) Prior Publication Data

US 2007/0079377 A1  Apr. 5, 2007

(51) Int. Cl.
*G06F 21/00* (2013.01)
*G06F 21/56* (2013.01)

(52) U.S. Cl.
CPC .................... *G06F 21/562* (2013.01)

(58) Field of Classification Search
CPC ...................................... G06F 21/562
USPC ...................................... 726/23–25
See application file for complete search history.

(56) References Cited

U.S. PATENT DOCUMENTS

| | | | | |
|---|---|---|---|---|
| 5,432,939 | A | | 7/1995 | Blackledge, Jr. et al. ..... 395/700 |
| 5,684,875 | A | * | 11/1997 | Ellenberger ...................... 482/4 |
| 5,826,012 | A | * | 10/1998 | Lettvin ............................ 726/22 |
| 6,029,256 | A | * | 2/2000 | Kouznetsov .................... 714/38 |
| 6,065,118 | A | | 5/2000 | Bull et al. ...................... 713/200 |
| 6,088,801 | A | | 7/2000 | Grecsek ......................... 713/200 |
| 6,269,456 | B1 | * | 7/2001 | Hodges et al. .................. 714/38 |
| 6,279,128 | B1 | * | 8/2001 | Arnold et al. ................... 714/49 |
| 6,401,202 | B1 | * | 6/2002 | Abgrall ............................ 713/2 |
| 6,560,632 | B1 | | 5/2003 | Chess et al. ................... 709/201 |
| 6,651,172 | B1 | | 11/2003 | Yu et al. ........................ 713/200 |
| 6,802,012 | B1 | | 10/2004 | Smithson et al. ............. 713/200 |
| 6,851,058 | B1 | * | 2/2005 | Gartside ......................... 726/24 |
| 6,938,161 | B2 | * | 8/2005 | Vignoles et al. .............. 713/188 |
| 7,188,367 | B1 | * | 3/2007 | Edwards et al. ................ 726/24 |
| 7,334,722 | B1 | * | 2/2008 | Hartmann et al. ............ 235/375 |
| 7,340,774 | B2 | * | 3/2008 | Hursey et al. .................. 726/22 |
| 7,448,084 | B1 | * | 11/2008 | Apap et al. ..................... 726/24 |
| 7,693,856 | B2 | * | 4/2010 | Arrouye et al. ........ 707/999.101 |

(Continued)

OTHER PUBLICATIONS

Symantec Antivirus 10.0 Business Pack/Symantec Client Security 3.0 with Groupware Protection Business Pack released Apr. 18, 2005 with features as evidenced by "About the Quick Scan feature in Symantec AntiVirus Corporate Edition 10.0 and Symantec Client Security 3.0" Article: TECH101176; 13 pages.*

(Continued)

*Primary Examiner* — Michael Pyzocha
(74) *Attorney, Agent, or Firm* — Edward J. Lenart; Katherine S. Brown; Kennedy Lenart Spraggins LLP

(57) ABSTRACT

The present invention provides a method, data processing system and program product in which scanning for a virus is improved by prioritizing the scan of executable files, such as applications, libraries, services etc., which are more likely to cause a problem to a computer system, ahead of other files. A priority order is determined free from user input by obtaining information from the operating system which can be used to determine such an order. For example the information comprises details of startup applications and/or launch frequency of installed applications. This enables the virus scanner to prioritize the scan of higher risk files which, if they contained a virus, would otherwise adversely affect a computer system if a prior art virus scan was performed based on an arbitrary search order.

13 Claims, 4 Drawing Sheets

(56) References Cited

U.S. PATENT DOCUMENTS

| | | | |
|---|---|---|---|
| 7,721,331 B1* | 5/2010 | Rowe | 726/22 |
| 7,895,654 B1* | 2/2011 | Millard | 726/24 |
| 2002/0104014 A1 | 8/2002 | Zobel et al. | 713/200 |
| 2002/0116628 A1* | 8/2002 | Vignoles et al. | 713/200 |
| 2002/0174349 A1 | 11/2002 | Wolff et al. | 713/188 |
| 2003/0074574 A1* | 4/2003 | Hursey et al. | 713/200 |
| 2003/0120952 A1* | 6/2003 | Tarbotton et al. | 713/201 |
| 2004/0177263 A1 | 9/2004 | Sobel et al. | 713/200 |
| 2004/0236960 A1* | 11/2004 | Zimmer et al. | 713/200 |
| 2005/0132206 A1* | 6/2005 | Palliyil et al. | 713/188 |
| 2006/0021041 A1* | 1/2006 | Challener et al. | 726/24 |
| 2006/0037079 A1* | 2/2006 | Midgley | 726/24 |
| 2006/0075502 A1* | 4/2006 | Edwards | 726/24 |

OTHER PUBLICATIONS

IBM Technical Disclosure Bulletin, vol. 32, No. 11, Apr. 1990, "System for Detecting Alteration of Software", pp. 48-50.

IBM United Kingdom patent application serial 0418066.7 filed Aug. 13, 2004.

\* cited by examiner

VIRUS SCANNING IN A COMPUTER SYSTEM

BACKGROUND OF THE INVENTION

1. Field of the Invention

The present invention relates to scanning for viruses on a computer system and more specifically to improving virus detection.

2. Background to the Invention

An extremely common problem in computing is the infection of a computer system with a so called virus. Viruses can take many forms but in general are software programs which make unwanted use of computer resources and in worst cases render a computer system unusable.

In order to combat such virus infections many software providers, such as Symantec Corp and McAfee Inc, provide virus scanning software which can be used to scan for the existence of viruses in files held in computer storage and take action to remove them. Further such software allows a user to tailor the virus scan which is performed. For example it is possible to specify directories of the file system to include in, or exclude from, the scan, and similarly file types or file extensions to include in, or exclude from, the scan. Further it is possible to specify a scan of running programs held in memory and a scan for extended threats, such as spyware and adware. This provides the user of virus scanning software with many ways of tailoring a virus scan to be performed to suit the needs of a user.

However a problematic aspect of existing virus scan software is that the order in which directories of the file system are scanned is arbitrarily selected, a common solution being to scan the directories included in a scan in alphabetic order. For example, consider a virus which exists in a file of the file system and which loads and re-boots the computer system a short time after the computer system is started. In this case, whether or not virus scanner software manages to detect and remove the virus within the short time the computer is running will depend on whether the arbitrary scan order which is used happens to search the appropriate directory within the time available. Thus there is no guarantee that such a virus can be detected and removed by prior art virus scan software.

SUMMARY OF THE INVENTION

Accordingly it is an object of the present invention to make the detection of problematic virus more efficient and therefore more likely to occur within a limited time period.

Accordingly according to a first aspect the present invention provides a method comprising: receiving a request to perform a virus scan of at least part of a computer file system; obtaining information relating to a plurality of entities in the file system which could cause execution of a virus; using the obtained information to determine an order to scan the at least part of a computer file system; and scanning the at least part of the file system, using the determined order, to look for presence of a virus.

According to a second aspect the present invention provides a data processing system comprising: at least one processor; and memory accessible to the at least one processor and comprising a file system; the at least one processor for performing sub-processes of: receiving a request to perform a virus scan of at least part of the file system; obtaining information relating to a plurality of entities in the file system which could cause execution of a virus; using the obtained information to determine a priority order to scan the at least part of a computer file system; and scanning the at least part of file system, using the determined priority order, to look for presence of a virus.

According to a third aspect the present invention provides a computer program product comprising a computer useable medium having a computer readable program, wherein the computer readable program when executed on a computer causes the computer perform the steps of: receiving a request to perform a virus scan of at least part of a computer file system; obtaining information relating to a plurality of entities in the file system which could cause execution of a virus; using the obtained information to determine a priority order to scan the at least part of a computer file system; and scanning the at least part of file system, using the determined priority order, to look for presence of a virus.

The entities about which information is obtained can be any data carrying file in the computer file system which is considered likely to cause the execution of a virus in the computer system, for example an executable file such as a program/application, library or service. For example an entity causes the execution of a virus if it is an executable entity and it contains a virus or if it calls or loads a separate entity which results in the execution of a virus.

The obtained information may take any form which can be used to determine an order to scan the computer file system such that a scan of the entities is prioritized. For example the obtained information may comprises details of where the entities are stored in the file system.

Optionally the entities are programs which are started during operating system startup and the determined order prioritizes the locations in the file system, such as folder or directory, of each such program.

Alternatively the entities are installed applications and the information includes, for each application, one or more of launch frequency, time of last launch, scan frequency, and time of last virus scan. In this case, for example, the determined order prioritizes the most frequently launched applications, and/or the least frequently scanned applications.

Optionally the request to perform a virus scan includes an indication that a priority order is to be determined and used when performing the requested scan. Optionally such a request further includes an indication of the basis on which the priority order is determined. For example this enables a virus scanner to provide the user with an option to request a prioritized virus scan and further to specify, for example, that the priority order is based on startup applications and/or installed applications.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATED EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
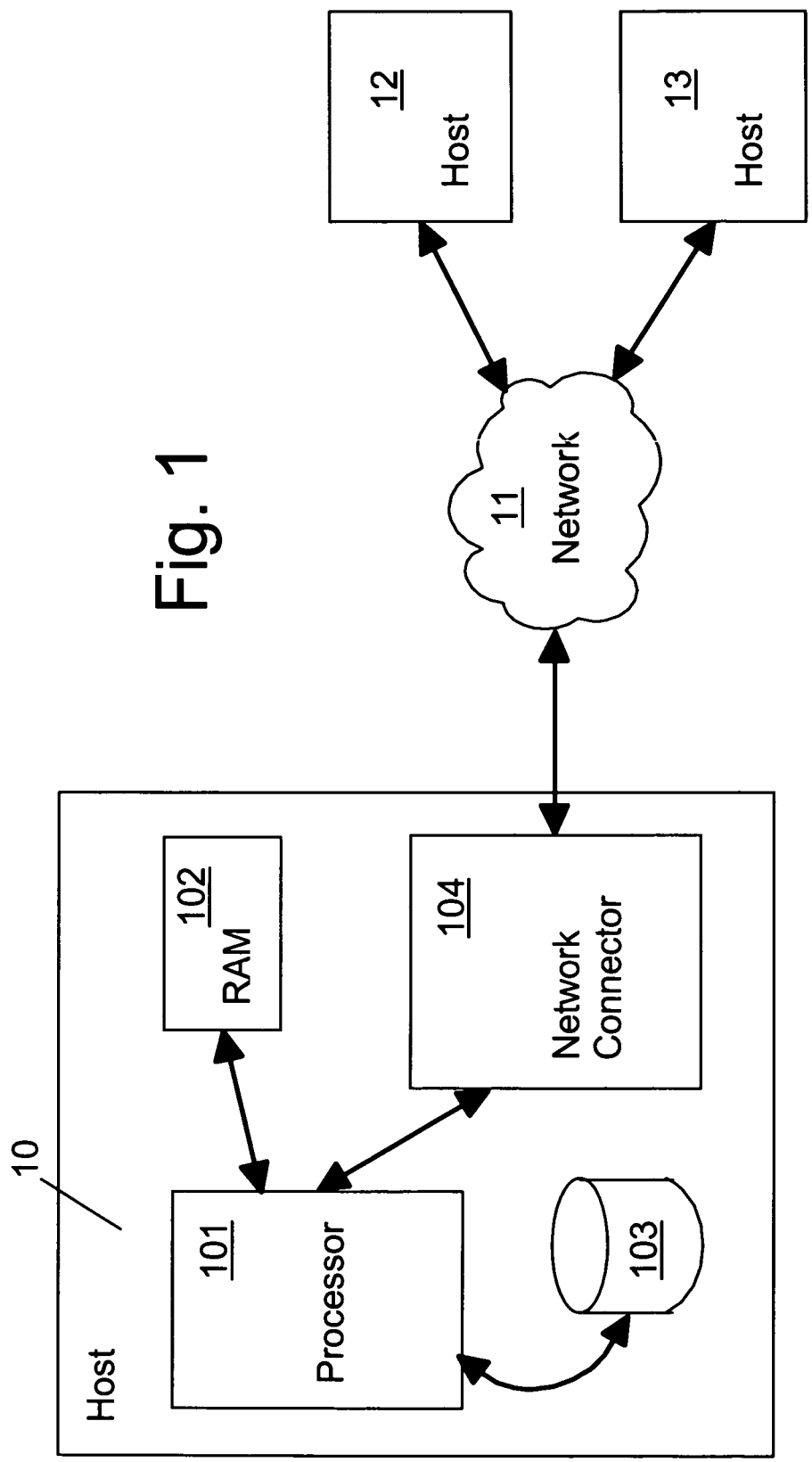
FIG. 1 is a block diagram of an example data processing environment in which the preferred embodiment of the present invention could be advantageously applied.

FIG. 1 is a block diagram of an example data processing environment in which the preferred embodiment of the present invention could be advantageously applied. In FIG. 1, a client/server data processing host 10 is connected to other client/server data processing host 12 and 13 via a network 11, which could be, for example, the Internet. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13. For example client/server 10 may have program instruction code in non-volatile memory 103 to carry out a virus scan, according to the preferred embodiment of the present invention, of RAM volatile memory element 102 and/or of a file system, or a sub-set of a file system, held in non-volatile memory 103.

In the preferred embodiment of the present invention it is assumed that a file system to be scanned comprises a plurality of folders/directories in which files are stored, such files comprising executable code and/or data which may contain a virus. Further folders/directories may logically contain other folders/directories in a tree like structure. Such a file system is found in most operating systems.

Figure 2:
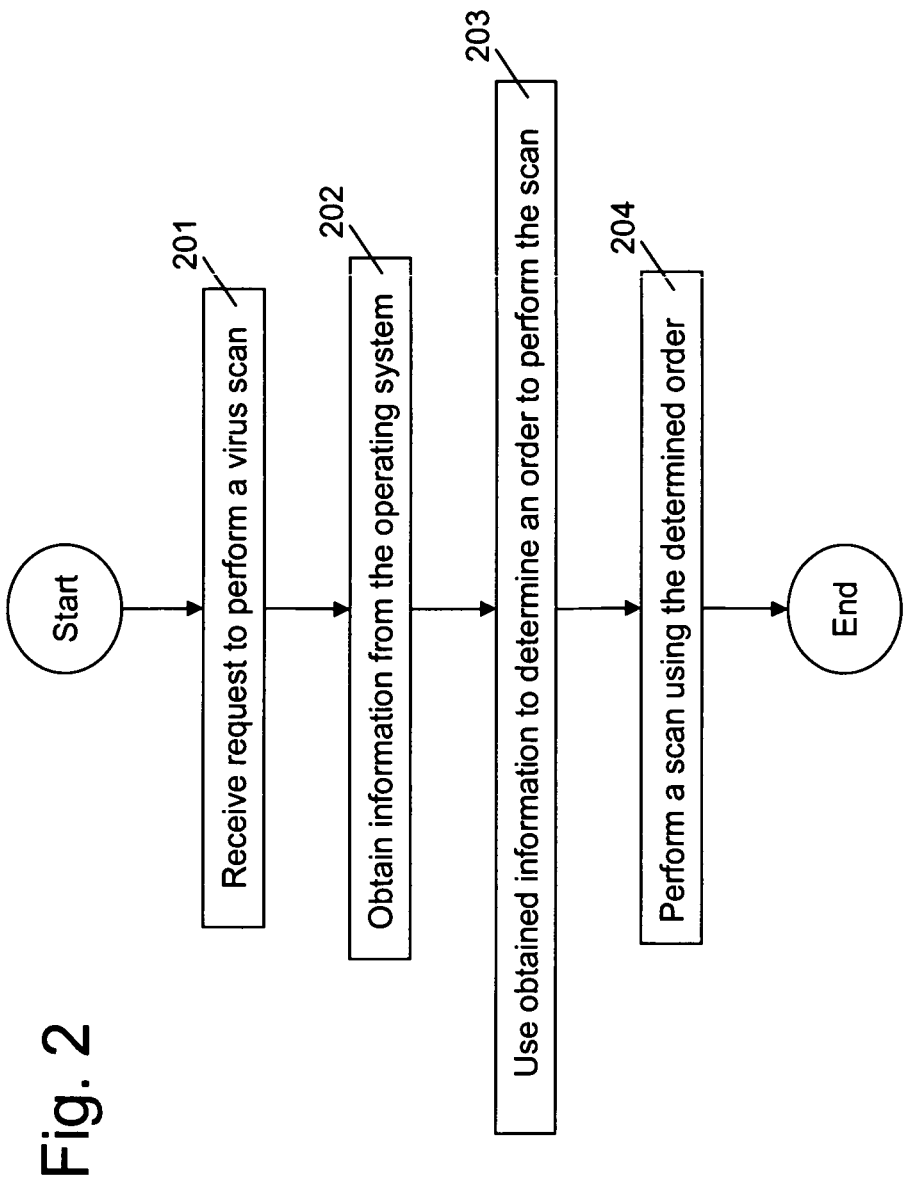
FIG. 2 is a flow diagram of determining an order to scan a file system for a virus as a result of a request to perform a virus scan.

FIG. 2 is a flow diagram of a preferred embodiment of the present invention. At step 201 a request is received to perform a virus scan of a computer system. For example the request may be to perform a scan of the entire file system or a subset of the file system. However the request does not specify a priority order in which to scan the parts of the file system to be scanned. As a result, at step 202, information is obtained which relates to entities which are considered more likely, compared to other entities in the file system, to cause execution of a computer virus. The information is obtained from the operating system and comprises data which may be used to determine a priority order which prioritizes the scan of those parts of the file system in which the entities are stored. At step 203 this information is then used to determine a priority order to perform the scan and at step 204 a virus scan is performed using the priority order determined at step 203.

Note that the information obtained at step 202 may comprise any data which can be used to determine a priority order to scan the file system or a sub-set of the file system, for example by prioritizing the contents of one or more of the folders in a file system ahead of other folders of the file system. Two suitable forms of data are now discussed with reference to FIGS. 3 and 4, although a skilled person will realize that other forms of data could be used.

Figure 3:
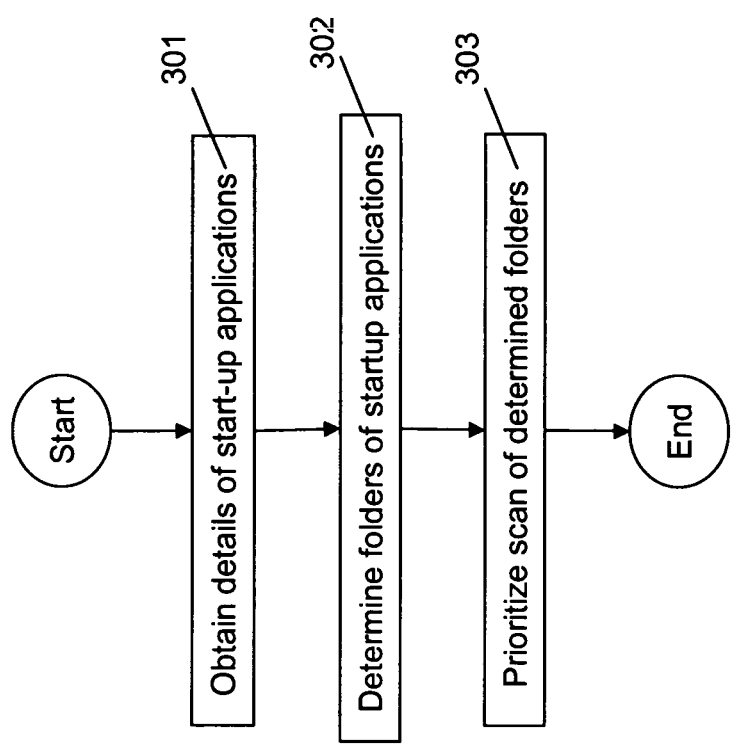
FIG. 3 is a flow diagram of determining an order to perform a virus scan using details of start-up programs.

FIG. 3 is a flow diagram of a preferred embodiment of steps which may be performed as steps 202 and 203 of FIG. 2. At step 301 details of startup programs are obtained from the operating system, such programs being those that are configured to be automatically started when the operating system is started. For example such details can be obtained from the system registry of a Microsoft Windows™ operating system. The details obtained include a fully qualified name of each startup program executable file. At step 302 the folders in which each of the executable files are stored are determined from the associated fully qualified names, and at step 303 the determined folders are prioritized to be the folders first searched as part of a virus scan. Optionally the scan of a determined folder includes the sub-folders of the folder if such sub-folders exist. Alternatively, rather than scanning the folder of an executable file, only the executable file is scanned although this in not preferred because other executable files which are loaded as part of the application may exist in the folder.

Figure 4:
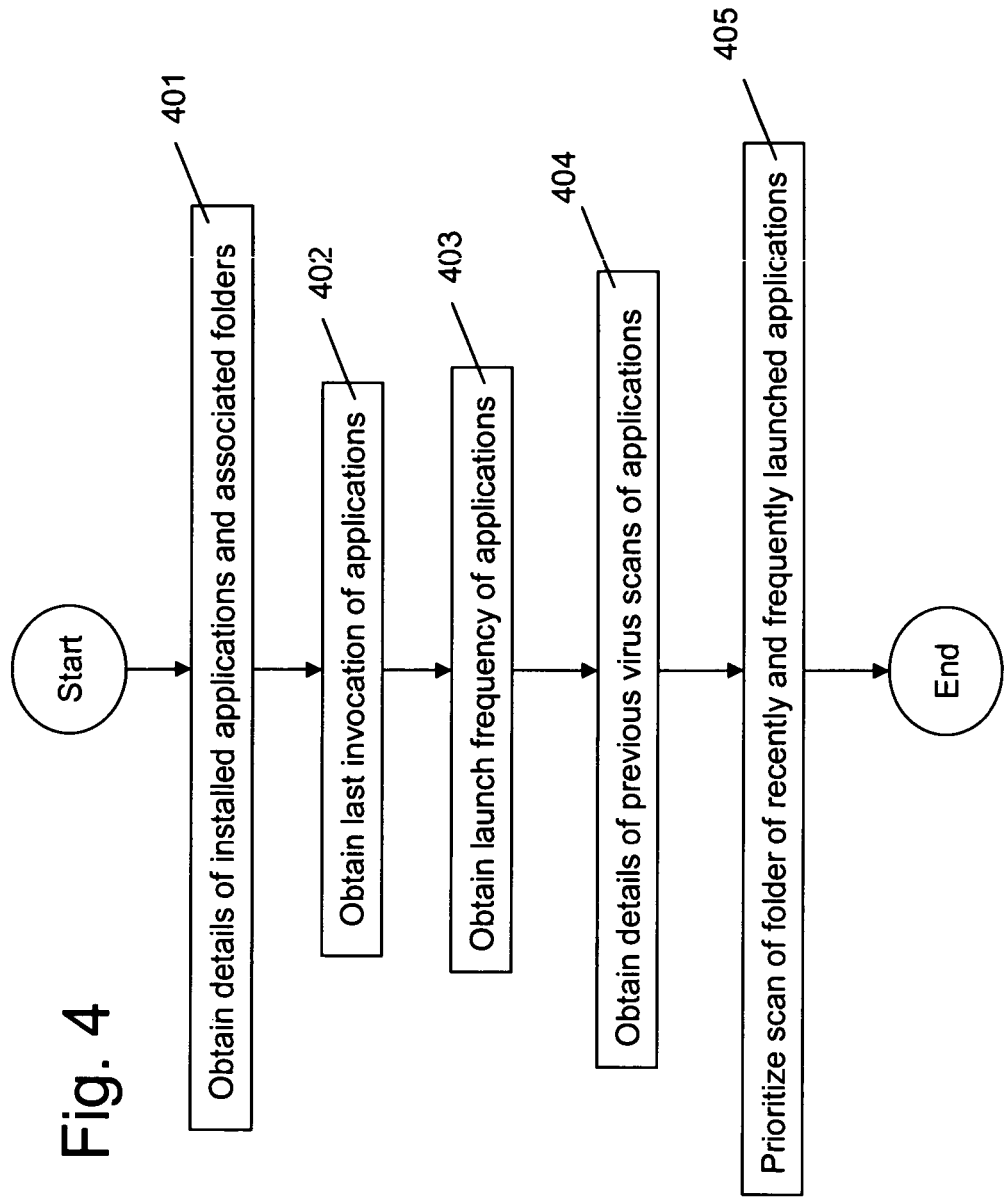
FIG. 4 is a flow diagram of determining an order to perform a virus scan using details of installed applications.

FIG. 4 is a flow diagram of an alternative embodiment of steps which may be performed as steps 202 and 203 of FIG. 2. At step 401 details of installed applications including the folders in which the installed applications are stored are obtained from the operating system. At step 402 the time of the last invocation of each application is obtained and at step 403 the launch frequency of the applications is obtained, for example this comprises the number of launches over a set time period, or number of launches for a given number of start-ups of the operating system. At step 204 details of previous virus scans of each application are obtained, such details comprising the number of virus scans performed on the application over a set time period and/or the time of the last virus scan performed on the application. At step 405 the information obtained at steps 402, 403 and 404, is used to determine an order to scan the folders obtained at step 401 and which are scanned before any other folders of the file system. For example the order can prioritize the most recently launched applications, the most frequently launched applications, the least frequently virus scanned applications, the least recently virus scanned applications, or those determined using an algorithm which takes in account the information obtained at 2 or more of steps 402, 403 and 404. Note that in alternative embodiments any one or two of steps 402, 403 and 404 may be omitted.

The preferred embodiment of a virus scanner which implements the present invention further provides an option with which a user can request a virus scan to be based on a prioritized order. For example the option can provide an option to perform a scan and include a priority scan of startup applications and/or installed applications. Optionally such an option further provides for the specification of a basis on which to determine a prioritized order. For example such an option may be used request a prioritized order based on one or more of: launch frequency, time since last launch; scan frequency; and time since last virus scan.

A skilled person will realize that whilst certain forms of data have been described from which a prioritized order can be determined, other forms of data could be used under the scope of the present invention. The form of data used will depend to some extent on that which is available at the time of obtaining the data. For example other form of data may include, but are not limited to, location in which viruses are most frequently found, amount of computer resources used by an application, and/or the length of time since the application was installed on the computer system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

The medium can be an electronic, magnetic, optical, electromagnetic, medium or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In summary present invention provides a method, data processing apparatus and computer program product, in which an improved virus scan is performed by prioritizing the scan of executable files, such as applications, libraries, services etc., which are more likely, compared to other files in the file system, to cause a problem to a computer system, ahead of the other files. A priority order is determined free from user input by obtaining information from the operating system which can be used to determine such an order. For example the information comprises details of startup applications and/or launch frequency of installed applications. This enables the virus scanner to prioritize the scan of higher risk files which, if they contained a virus, would otherwise adversely affect a computer system if a prior art virus scan was performed based on an arbitrary search order.

What is claimed is:

1. A method comprising:
   receiving a request to perform a virus scan of at least part of a computer file system in a computer that includes computer memory and a computer processor, wherein the request includes an indication that startup applications of the computer are to be prioritized for virus scanning;
   obtaining information relating to a plurality of entities in the computer file system which could cause execution of a virus;
   using the obtained information to determine the priority order to scan the at least part of the computer file system, the determined priority order prioritizing startup applications over other entities in the at least part of the computer file system; and
   scanning the at least part of the computer file system, using the determined priority order, to look for presence of a virus, wherein scanning the at least part of the computer file system, using the determined priority order comprises:
      scanning at least one startup application before scanning any other files based on the determined priority order.

2. The method of claim 1 wherein the entities comprise installed applications and the obtained information further comprises, for each such application, one or more of launch frequency, time of last launch, virus scan frequency and time of last virus scan.

3. The method of claim 1 wherein the information is obtained from data stored on the computer by use of an operating system.

4. The method of claim 1 wherein the request comprises an indication that a priority order is to be determined and used when performing the requested scan.

5. The method of claim 1 wherein the entities comprise programs which are started during an operating system startup and the determined order prioritizes the locations in the file system of each such program.

6. A data processing system comprising:
   at least one computer processor; and
   memory accessible to the at least one computer processor and comprising a computer file system;
   the at least one computer processor for performing sub-processes of:
   receiving a request to perform a virus scan of at least part of a computer file system in a computer that includes computer memory and a computer processor, wherein the request includes an indication that startup applications of the computer are to be prioritized for virus scanning;
   obtaining information relating to a plurality of entities in the computer file system which could cause execution of a virus;
   using the obtained information to determine the priority order to scan the at least part of the computer file system, the determined priority order prioritizing startup applications over other entities in the at least part of the computer file system; and
   scanning the at least part of the computer file system, using the determined priority order, to look for presence of a virus, wherein scanning the at least part of the computer file system, using the determined priority order comprises:
      scanning at least one startup application before scanning any other files based on the determined priority order.

7. The data processing system of claim 6 wherein the entities comprise installed applications and the obtained information further comprises, for each such application, one or more of launch frequency, time of last launch, virus scan frequency and time of last virus scan.

8. The data processing system of claim 6 wherein the request comprises an indication that a priority order is to be determined and used when performing the requested scan.

9. The data processing system of claim 6 wherein the entities comprise programs which are started during an operating system startup and the determined order prioritizes the locations in the file system of each such program.

10. A computer program product comprising a non-transitory computer readable recording medium having a computer readable program, wherein the computer readable program when executed on a computer causes the computer perform the steps of:
   receiving a request to perform a virus scan of at least part of a computer file system in a computer that includes computer memory and a computer processor, wherein the request includes an indication that startup applications of the computer are to be prioritized for virus scanning;
   obtaining information relating to a plurality of entities in the computer file system which could cause execution of a virus;
   using the obtained information to determine the priority order to scan the at least part of the computer file system, the determined priority order prioritizing startup applications over other entities in the at least part of the computer file system; and scanning the at least part of the computer file system, using the determined priority order, to look for presence of a virus, wherein scanning the at least part of the computer file system, using the determined priority order comprises:

scanning at least one startup application before scanning any other files based on the determined priority order.

11. The computer program product of claim 10 wherein the entities comprise installed applications and the obtained information further comprises, for each such application, one or more of launch frequency, time of last launch, virus scan frequency and time of last virus scan.

12. The computer program product of claim 10 wherein the request comprises an indication that a priority order is to be determined and used when performing the requested scan.

13. The computer program product of claim 10 wherein the entities comprise programs which are started during an operating system startup and the determined order prioritizes the locations in the file system of each such program.

* * * * *